US006798775B1

(12) United States Patent
Bordonaro et al.

(10) Patent No.: US 6,798,775 B1
(45) Date of Patent: Sep. 28, 2004

(54) VIRTUAL LANS OVER A DLSW NETWORK

(75) Inventors: Frank Bordonaro, Los Gatos, CA (US); Richard Livingston, Hollister, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/330,115

(22) Filed: Jun. 10, 1999

(51) Int. Cl.$^7$ ............................................... H04L 12/28
(52) U.S. Cl. ...................................... 370/392; 370/401
(58) Field of Search .............................. 370/395.1, 396, 370/397, 399, 395.3, 395.31, 395.52, 395.53, 409, 389, 392

(56) References Cited

U.S. PATENT DOCUMENTS

| | | | |
|---|---|---|---|
| 5,394,402 A | 2/1995 | Ross ........................ | 370/94.1 |
| 5,684,800 A | 11/1997 | Dobbins et al. ............ | 370/401 |
| 5,740,171 A | 4/1998 | Mazzola et al. ............ | 370/392 |
| 5,742,604 A | 4/1998 | Edsall et al. ................ | 370/401 |
| 5,752,003 A | 5/1998 | Hart .......................... | 395/500 |
| 5,872,783 A | 2/1999 | Chin .......................... | 370/392 |
| 5,889,776 A | 3/1999 | Liang ........................ | 370/389 |
| 5,917,820 A | 6/1999 | Rekhter ...................... | 370/392 |
| 5,918,022 A | 6/1999 | Batz et al. ............. | 395/200.66 |
| 5,940,390 A | 8/1999 | Berl et al. .................. | 370/389 |
| 5,991,302 A | 11/1999 | Berl et al. .................. | 370/400 |
| 5,999,536 A | 12/1999 | Kawafuji et al. ........... | 370/401 |
| 6,023,563 A | 2/2000 | Shani ..................... | 395/200.79 |
| 6,035,105 A | 3/2000 | McCloghrie et al. .. | 395/200.66 |
| 6,065,062 A * | 5/2000 | Periasamy et al. .......... | 709/242 |
| 6,219,699 B1 * | 4/2001 | McCloghrie et al. ....... | 709/221 |
| 6,430,595 B1 * | 8/2002 | Ferguson et al. ........... | 709/200 |
| 6,430,621 B1 * | 8/2002 | Srikanth et al. ............ | 709/238 |

OTHER PUBLICATIONS

Well et al, Request For Comment (RFC) 1795 (1995).*
IEEE Standards for Local and Metropolitan Area Networks: Virtual Bridged Local Area Networks, IEEE P802, Mar. 20, 1998.
L. Wells, Chair, Internetwork Technology Institute and A. BARTKY, Editor, Editor, Sync Research, Inc., Data Link Switching: Switch–to–Switch Protocol AIW DLSw RIG: DLSw Closed Pages, DLSw Standard Version 1.0, Network Working Group, RFC 1795, Apr. 1995.

* cited by examiner

Primary Examiner—Wellington Chin
Assistant Examiner—Brenda Pham
(74) Attorney, Agent, or Firm—Cesari and McKenna, LLP

(57) ABSTRACT

The invention provides a Virtual Local Area Network (VLAN) over a DLSw interconnection so that VLAN identification is preserved as a packet is forwarded from a source VLAN over the TCP/IP link of the DLSw interconnection to a corresponding destination VLAN. A packet assigned to a VLAN is received by a first router. The first router uses a universal parser to determine the VLAN assignment of the packet. The parser is universal as it responds to the type of packet and type of VLAN (Ethernet, IEEE 802.5, etc.). The parser then writes VLAN information into a data structure in the router memory. The parsed data written into the data structure may include the following: the VLAN identification; a user priority identification; a CFI tag field; etc. The information fields in the data structure are assigned to the particular packet as it is processed by the router. Finally, as an outgoing encapsulated packet is built by the router, the fields of the data structure are read by the processes building the packet and written into fields of the encapsulating header. An encapsulated packet is then built by the first router for transmission over a TCP/IP connection with an encapsulating SSP header. A second router receives the encapsulated packet. The second router then builds a VLAN packet in response to the VLAN identification read from the encapsulating header and transmits the packet onto a destination VLAN corresponding to the source VLAN.

20 Claims, 13 Drawing Sheets

400

| EVEN BYTE | ODD BYTE |
|---|---|
| (00) VERSION NUMBER | (01) HEADER LENGTH (=72) |
| (02) MESSAGE LENGTH | |
| (04) REMOTE DATA CORRELATOR | |
| (08) REMOTE DLC PORT ID | |
| (12, 13) VLAN INDICATOR, PRIORITY TAG, CFI TAG | |
| (14) MESSAGE TYPE | (15) FLOW CONTROL BYTE |
| (16) PROTOCOL ID | (17) HEADER NUMBER |
| (18) RESERVED | |
| (20) LARGEST FRAME SIZE | (21) SSP FLAGS |
| (22) CIRCUIT PRIORITY | (23) MESSAGE TYPE |
| (24) TARGET MAC ADDRESS (NON-CANONICAL FORMAT) | |
| (30) ORIGIN MAC ADDRESS (NON-CANONICAL FORMAT) | |
| (36) ORIGIN LINK SAP | (37) TARGET LINK SAP |
| (38) FRAME DIRECTION | (39) RESERVED |
| (40) RESERVED | |
| (42) DLC HEADER LENGTH | |
| (44) ORIGIN DLC PORT ID | |
| (48) ORIGIN DATA LINK CORRELATOR | |
| (52) ORIGIN TRANSPORT ID | |
| (56) TARGET DLC PORT ID | |
| (60) TARGET DATA LINK CORRELATOR | |
| (64) TARGET TRANSPORT ID | |
| (68) RESERVED FIELD | |
| (70) RESERVED FIELD | |

402 points to row (12, 13).

CONTROL MESSAGE

FIG. 4

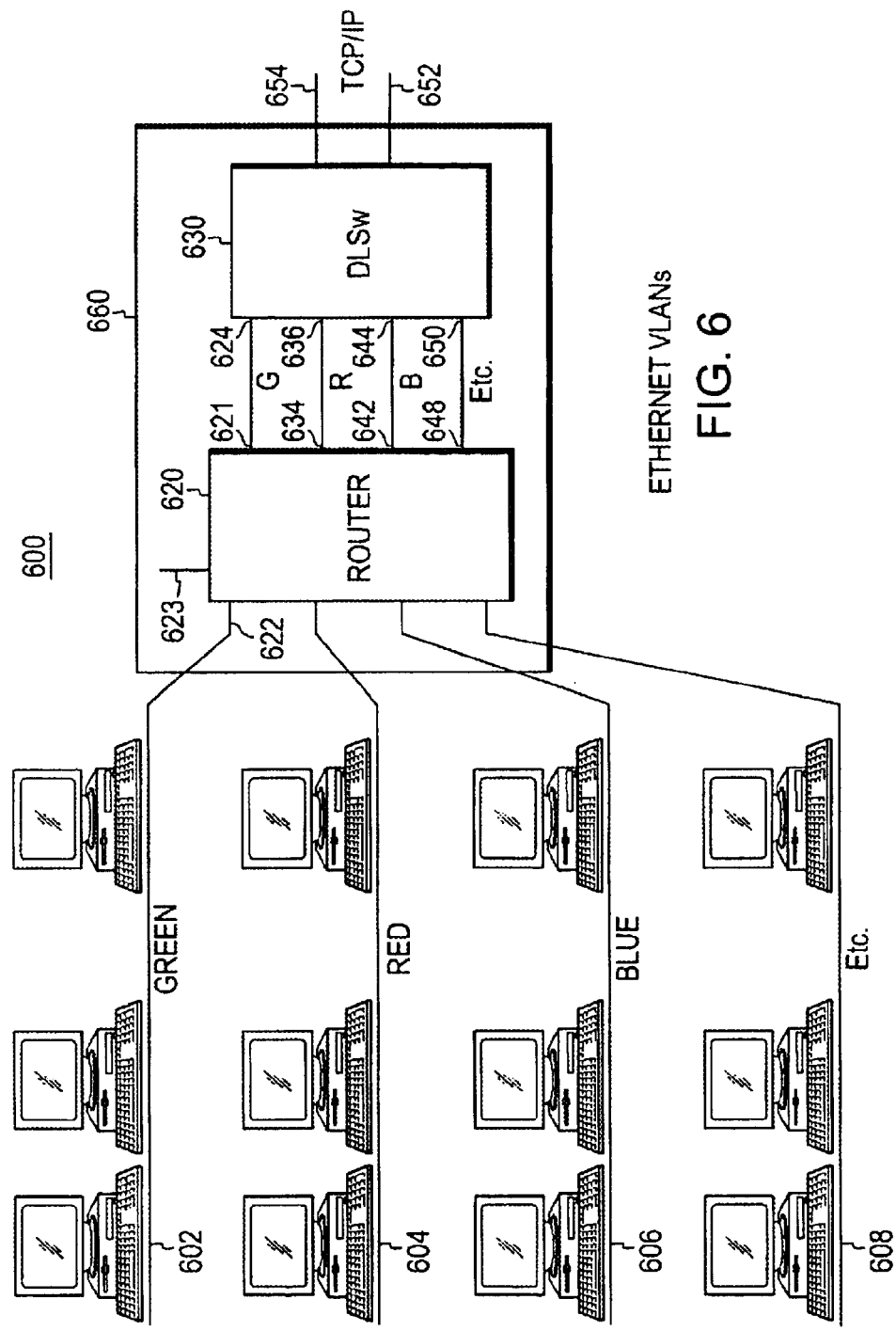

IEEE 802.1Q
TAG HEADER FOR IEEE 802.5 TOKEN RING

ENCAPSULATED FRAME

VIRTUAL LANS OVER A DLSW NETWORK

FIELD OF THE INVENTION

The invention relates to transfer of packets over a computer network, and more particularly to the use of a virtual local area network (VLAN) to address packets to a desired group of users throughout a wide area network.

BACKGROUND OF THE INVENTION

When a source computer transmits a packet onto a computer network, ordinarily the packet is transferred to every computer connected to the network as a potential destination computer. Each potential destination computer reads the destination address of the packet. In the event that the destination address indicates that the computer should receive the packet, the computer copies the packet into its memory and "receives" the packet, otherwise the computer ignores the packet.

Two levels of addressing are typically used in computer networks, the physical address and the Internet Protocol (IP) address. The physical address is usually assigned to a computer by the manufacturer, and is referred to as the "layer 2" address as it is recognized and used by source and destination computers at layer 2 of the Internet Protocol communications model. A synonym of "layer 2" address is the term "Media Access Address" (MAC address). The "layer 3" address is referred to as the Internet Protocol address (IP address), and it is used by "layer 3 procedures" of the Internet Protocol communications model.

During typical operation of a computer network, a packet is received by a computer based on its physical, or MAC, address. Computers connected to a computer network may be roughly categorized as "end stations", a "layer 2 switch" or bridge, and a "layer 3 switch" or router. When the IP address is for the same computer as the MAC address, the computer is typically an end station and receives the packet. A layer 2 switch, or bridge, typically joins to small local area networks, typically referred to as "subnets", and forwards the packet from a first subnet to a second subnet. A local area network is referred to as a "LAN" (plural, LANS).

A layer 3 switch, or router, receives a packet having the MAC address of the router and an IP address of a computer on a different subnet. The router, in response to the IP address in the layer 3 address field of the packet, routes the packet on its journey to the computer designated by the IP address of the packet. The router routes the packet from a source network to a destination network, in response to the IP address carried in the packet.

The MAC destination address field of a packet may indicate that the packet is addressed to a specific computer (unicast address), or may indicate that all computers on the network are designated to receive the packet (multicast address). Virtual Local Area Networks (VLANs) were introduced in order to provide a convenient way to have a selected group of computers receive a packet, in contrast to having only two choices of one computer or all computers receive the packet.

The VLAN construction, in an exemplary VLAN implementation, uses a router to define VLANs. A router typically has a plurality of ports, and each port may be connected to a different subnet, to a wide area network, to another router, etc. The VLAN implementation defines selected ports of a router to be members of a particular VLAN. The router then forwards a packet arriving on a port defined as a member of a particular VLAN onto all ports having the same VLAN designation, and onto no other ports. A plurality of routers may connect different subnets belonging to the same VLAN by having the ports of each router designated as ports for that particular VLAN. For example, VLANs implemented using Ethernet subnets typically are implemented by using selected ports of a router to define each VLAN. It is a common practice to use a "color" designation to specify a VLAN. Thus, certain ports of a router may be designated as the "red" VLAN ports, other ports the "blue" VLAN ports, still other ports the "green" VLAN ports, etc.

Another VLAN implementation is defined in IEEE Standard 802.1Q, (IEEE Draft Standard P802.1Q/D10, dated Mar. 22, 1998, all disclosures of which are incorporated herein by reference). Each packet carries a "tag" which identifies the packet as belonging to a VLAN. For example, a two byte field is defined as a "Tag Control Information" (TCI) format to carry VLAN, priority, and "canonical" information. The VLAN identification is 12 bits and is referred to as the "VID" field. The priority field is 3 bits, and so can represent 8 priority layers, from 0 to 7. The "canonical" indicator is 1 bit and designates the method of ordering the significant bits in the fields (canonical or noncanonical). The canonical indicator is referred to herein as the "CFI" tag, or CFI tag field. The structure of the Tag Header is more fully described in Clause 9.3 of IEEE 802.1Q, especially for different types of frames, Ethernet, SNAP SAP encoded, etc.

Secure Data Exchange (SDE) is defined in the IEEE Standard 802.10 (IEEE Standard 802-10-1998, Approved 17 Sep. 1998, all disclosures of which are incorporated herein by reference). An SDE designator field in a packet occupies the first three octets in the LLC header, and a SDE packet has the values 0A0A03 in the SDE designator field. Non SDE entities, including stations, bridges, routers, etc., ignore a packet having a SDE designator. Accordingly, a SDE packet is transmitted by a computer which writes an SDE designator field, and is received by only those computers which interpret the SDE designator field. Therefore, packets with an SDE designator field behave much as do packets with a virtual local area network identification assignment, in that the SDE designator is equivalent to a VLAN ID.

Further, VLAN identification is included in an encapsulating header, for example, an encapsulating header for Ethernet packets. The ISL format of Cisco Systems, Inc. provides a 12 bit VLAN identification in an encapsulating header for Ethernet packets, as set out in the document "*Configuring Routing between VLANs with ISL Encapsulation*", available on the Web page at www.cisco.com maintained by Cisco Systems, Inc., all disclosures of which are incorporated herein by reference.

VLANs are widely used today in communications using Ethernet (IEEE 802.3) LANs. Particularly, a VLAN may be implemented on geographically separated Ethernet LANs by the ISL format of Cisco Systems, Inc. used to provide a trunk connection between the two geographically separated Ethernet LANs. The "trunk" connection is logically many VLANs sharing the same communications path. An example of geographically separated Ethernet LANs may be one LAN in New York City and the other in San Francisco, with a VLAN capable media connection between the two LANs implementing VLAN format. The IEEE 802.1Q standard protocol is similar to the Cisco Systems, Inc. ISL format and may also be used to join geographically separated LANs into a VLAN with tagged packets. The advantage of using the VLAN format is that only those computers receiving a particular tag, for example, red, or blue, or green, etc., will receive the tagged packets, and thereby reduces the number of computers receiving the tagged packets.

Data Link Switching (DLSw) is defined in RFC 1795 (Internet Engineering Task Force, Request for Comments 1795, April 1995, all disclosures of which are incorporated herein by reference) as a means for interconnecting a first network served by a first router to a second network served by a second router by operating a TCP/IP connection between the two routers. An encapsulating protocol referred to as Switch to Switch (SSP) protocol encapsulates the packets received from the networks before transmission over the TCP/IP connection, as set out in RFC 1795. These two routers are referred to as the "DLSw routers" because a port of each is used to establish the DLSw connection between the two networks. In a widely used configuration, both the first network and the second network are source routed networks such as an IEEE 802.5 Source Route Bridge (SRB) network. Accordingly, the first and second networks comprise IEEE 802.5 token rings connected by SRB bridges to form SRB subnets, and a plurality of SRB subnets may be interconnected by routers to form either the first network or the second network. In this exemplary embodiment, a DLSw connection over TCP/IP between two routers (layer 3 switches) interconnects two SRB networks. Each of the SRB networks may implement VLAN identification by use of one of the above mentioned VLAN methods, or by other methods. However the DLSw connection over TCP/IP does not preserve the VLAN identification.

Additionally, the DLSw routers may be connected to a variety of different types of networks. For example, a port of the DLSw router may connect to an SRB network, another port may connect to an Ethernet network, another port may connect to an IEEE 802.1Q network, etc. And each of the types of networks may implement VLAN identification by use of any of the VLAN identification methods mentioned above, or by other methods.

A problem in using DLSw communication over TCP/IP between two networks is that VLAN identification (Ethernet, SRB, or otherwise) which is established in the networks is not preserved over the DLSw connection. A further problem in attempting to establish VLAN identification over DLSw communication is that the protocols are established in legacy equipment. Any change in a protocol must interoperate with legacy equipment so as to not obsolete the installed base of existing equipment.

There is needed a simple method to provide VLAN identification over DLSw interconnection of a variety of networks, so that a packet routed from a VLAN within the source network will be received by only those stations identified as members of a corresponding VLAN within the destination network. And in the event that the packet is routed between other networks by a legacy router which does not preserve VLAN identification, then the method should interoperate correctly with the legacy router and with other legacy equipment.

SUMMARY OF THE INVENTION

The invention provides a Virtual Local Area Network (VLAN) over a DLSw interconnection so that VLAN identification is preserved as a packet is forwarded from a source VLAN over the TCP/IP link of the DLSw interconnection to a corresponding destination VLAN. Steps of the method include receiving a packet assigned to a VLAN by a first router. The first router determines the VLAN assignment of the packet, either by identifying the packet type (Ethernet, IEEE 802,5, etc.) and then parsing the packet header to learn the VLAN identification, or in routers having ports assigned to a VLAN by simply noting the port through which the packet arrived at the first router. An encapsulated packet is then built by the first router for transmission over a TCP/IP connection with an encapsulating SSP header. An indicia of the VLAN identification is written into the SSP header using previously reserved fields. The encapsulated packet is then transmitted over the TCP/IP network to a second router. The second router receives the encapsulated packet and parses the header of the received encapsulated packet, in order to read the VLAN identification from the header. The second router then builds a VLAN packet in response to the VLAN identification read from the header and transmits the packet onto a destination VLAN corresponding to the source VLAN.

The parser in the router receiving a VLAN packet from a local area network is universal as it responds to the type of packet and type of VLAN information of the received packet, and then parses the packet in order to learn the VLAN to which the packet is assigned. The parser then writes VLAN information into a data structure in the router memory. The parsed data from the received packet may include the following information: the VLAN identification field; a user priority identification field; a CFI tag field; etc., and these information fields are written into the data structure maintained in the router memory. The information fields in the data structure are assigned to the particular packet as it is processed by the router. Finally, as the outgoing encapsulated packet is being built by the router, the fields of the data structure are read by the processes building the packet, and the information read from the data structure is written into fields of the encapsulating header.

When the encapsulated packet is received by the second router, the VLAN fields are read from the encapsulating header, written into a data structure of the receiving second router and assigned to the particular packet. Processes building an outgoing packet then read the data structure and write the information into appropriate fields of the outgoing packet, in response to both the type of the outgoing packet and the type of the destination VLAN.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

The invention description below refers to the accompanying drawings, of which:

FIG. 4 is a block diagram of fields of a SSP control message.

FIG. 6 is a block diagram of an Ethernet VLAN computer network;

DETAILED DESCRIPTION OF AN ILLUSTRATIVE EMBODIMENT

Figure 1:
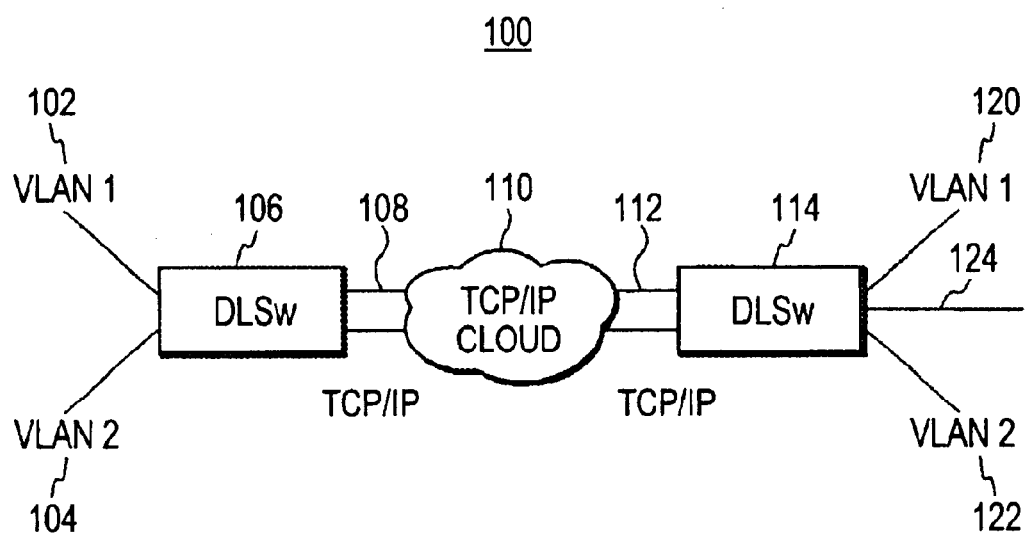
FIG. 1 is a block diagram of a computer network.

Turning now to FIG. 1, computer network 100 is shown. Virtual Local Area Network 1 (VLAN1) 102 and VLAN2 connect to Data Link Switch (DLSw) 106. DLSw 106 connects by two TCP/IP links 108 to network cloud 110. Network cloud 110 is a computer network that supports communication using the TCP/IP protocol. Network cloud 110 connects by TCP/IP connection 112 to DLSw 114. DLSw 114 connects to VLAN1 120, VLAN2 122, and to other possible local area networks (LANs) represented by LAN 124.

In operation, a station (not shown) on VLAN1 transmits a packet which is received by DLSw 106. DLSw 106 determines that the packet belongs to a virtual local area network (VLAN). DLSw 106 puts an indicia of the VLAN into a header of a Switch to Switch (SSP) protocol frame. DLSw 106 then transfers the frame over TCP/IP connection 108, through the TCP/IP network cloud 110, through TCP/IP connection 112, and finally to DLSw 114. DLSw 114 re-assembles the original packet from one or more SSP frames. The re-assembled packet is then forwarded by DLSw 114 onto VLAN1 120. DLSw 114 recognizes the virtual local area network indicia placed in the header of the frame from DLSw 106, and so DLSw 114 forwards the re-assembled packet onto VLAN1 120, and does not forward the packet onto VLAN2 or any other LAN represented by LAN 124.

Figure 2:
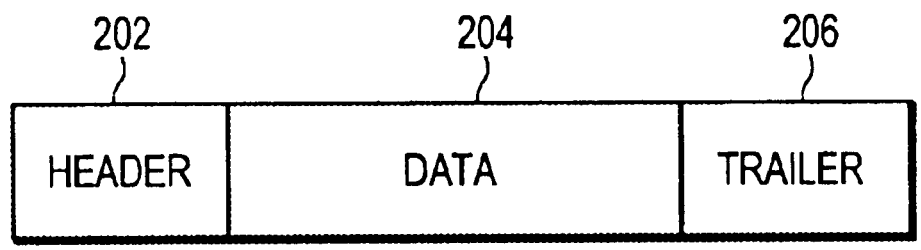
FIG. 2 is a block diagram of a SSP data frame.

Turning now to FIG. 2, a SSP message frame 200 is shown as defined in RFC 1795. SSP message frame 200 has header fields 202, data field 204, and trailer field 206. Trailer fields 206 comprise cyclic redundancy check fields, etc. as required by the TCP/IP protocol. SSP messages and Data Link Switches are more fully described in RFC 1795, as mentioned hereinabove.

Figure 3:
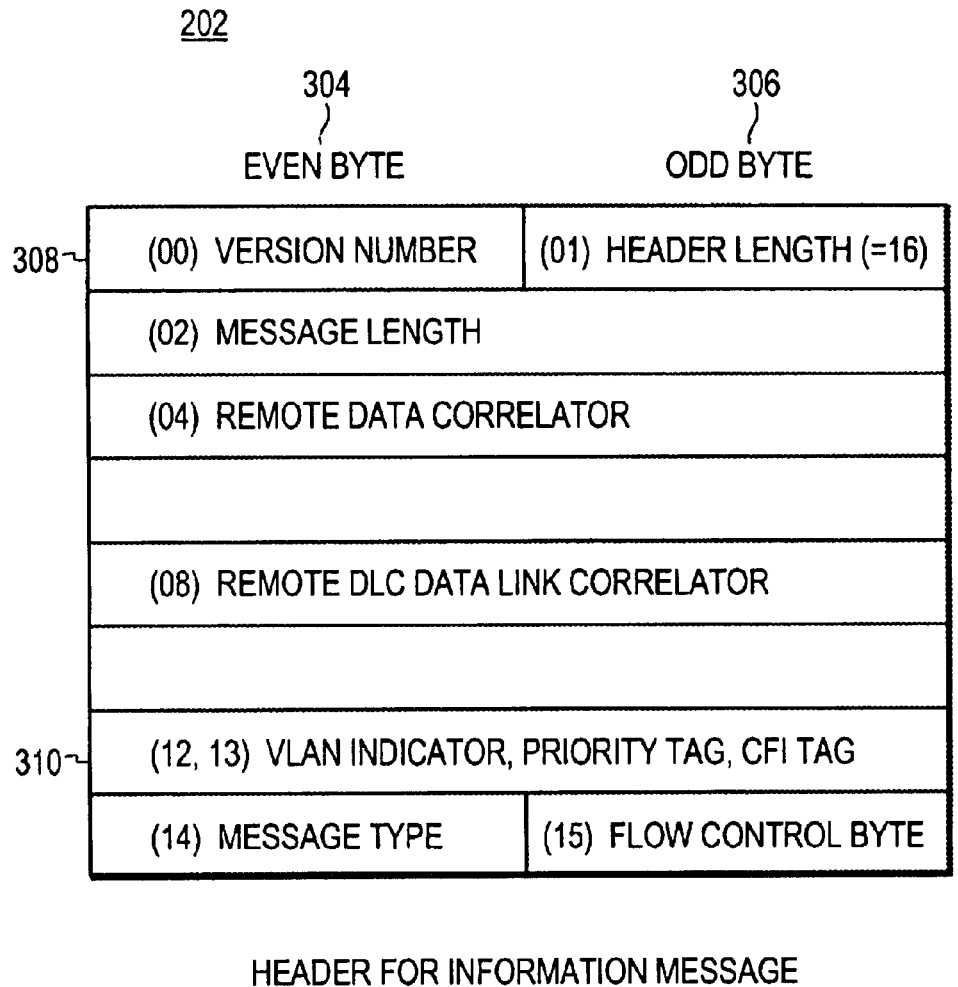
FIG. 3 is block diagram of header fields of a SSP information message.

Turning now to FIG. 3, header 202 for a SSP protocol messages transmitted over a TCP/IP connection, such as connections 108, 112, is shown. Inventive header 202 differs from the standard SSP header of RFC 1795 in the use of byte 12 and byte 13. The header is 16 bytes in length. The fields are shown in a two byte wide presentation, with the even byte 304 on the left of the drawing, and the odd byte 306 on the right of the drawing. Accordingly, eight (8) pairs of two (2) byte fields are shown. The byte numbers with zero (0) offset from the first byte 308 are shown in parenthesis in decimal notation at the left side of each block representing the field. Header 202 encapsulates message frames transmitted, for example, over TCP/IP connection 108, TCP/IP cloud 110, and TCP/IP connection 112 between DLSw 106 and DLSw 114, as shown in FIG. 2. The inventive SSP header 202 differs from the header set out in RFC 1795 in that bytes 12 and 13, reference numeral 310 in the inventive header 202, contain Virtual Local Area Identification (VLAN ID), priority tag, and CFI tag information. In a preferred embodiment of the invention as illustrated with reference to FIG. 8, the VLAN ID is 12 bits, the priority tag is 3 bits, and the CFI tag is 1 bit, for a total of 16 bits, or 2 bytes. In contrast, the header of RFC 1795 simply has bytes 12 and 13 as reserved bytes.

Turning now to FIG. 4 a control message 400 (similar to the control message of RFC 1795) is shown. The difference between the invention and the control message of RFC 1795 is that bytes 12, 13, reference numeral 402, contain VLAN ID, priority tag, and CFI tag information, also as illustrated with reference to FIG. 8. In contrast, the control message of RFC 1795 simply has bytes 12 and 13 as reserved bytes. As with the header bytes 12, 13, reference numeral 310, the bytes of control message 400 have a 12 bit VLAN ID, a 3 bit priority tag, and a 1 bit CFI tag.

As set out in RFC 1795, control message 400 is used to establish a circuit connection between two DLSw switches. The inventive control message 400 establishes, in addition to the connections described in RFC 1795, state variables in each DLSw switch identifying a virtual local area network indication (VLAN ID), a priority tag, and a CFI tag. The transmitting DLSw switch determines the incoming packet's VLAN identification, and the receiving DLSw switch parses the SSP incoming frame in order to recover the VLAN ID of the packet. The receiving DLSw switch then has enough information to properly route the incoming packet onto the correct destination VLAN.

Returning to FIG. 1, for example, a VLAN1 102 indication is learned by DLSw switch 106 from an incoming packet. The VLAN 102 indication is written into field 402 of control message 400 which sets up the TCP/IP connection in accordance with the DLSw protocol, including the new inventive VLAN identification, in the state variables of both DLSw switch 106 at the transmitting end of TCP/IP connection 108, 110, 112, and receiving DLSw switch 114. Receiving DLSw switch 114 then uses the VLAN ID obtained from control message 400 to identify its output port(s), and the VLAN ID, if required by the LAN technology and protocol, to write into an outgoing packet, for routing packets with that VLAN ID to its local area networks 120, 122, 124. Some VLANs are established simply by a router (switch) such as DLSw 106 or DLSw 114 keeping track of the ports assigned to the VLAN, as in Ethernet VLANs. Other VLAN protocols permit a plurality of VLANs on a single physical LAN, and keep track of the VLANs by use of a VLAN ID written into the packets, for example IEEE 802.1Q protocol. Receiving DLSw switch 114 then parses header 202 of FIG. 3 to learn the VLAN ID in bytes 12, 13 of fields 310 of incoming SSP data packets in order to decide which output port of DLSw 114 to route each incoming packet, and what VLAN ID to write into the outgoing packet when the protocol of the outgoing packet requires a VLAN ID to be written therein.

Accordingly, a packet identified with VLAN 1 102 has the VLAN ID written by DLSw switch 106 into bytes 12 and 13 of both the control message 400 setting up the connection, and bytes 12 and 13 of header 202 of each SSP data frame transmitted by DLSw switch 106. Receiving DLSw switch 114 then reads the VLAN ID from the respective fields of the control message (field 402) and the header field 310 of the data frames, and transmits the message onto VLAN 1 120, and does not transmit the message onto other VLANs such as VLAN 122, or other LANs such as LAN 124.

Figure 5A:
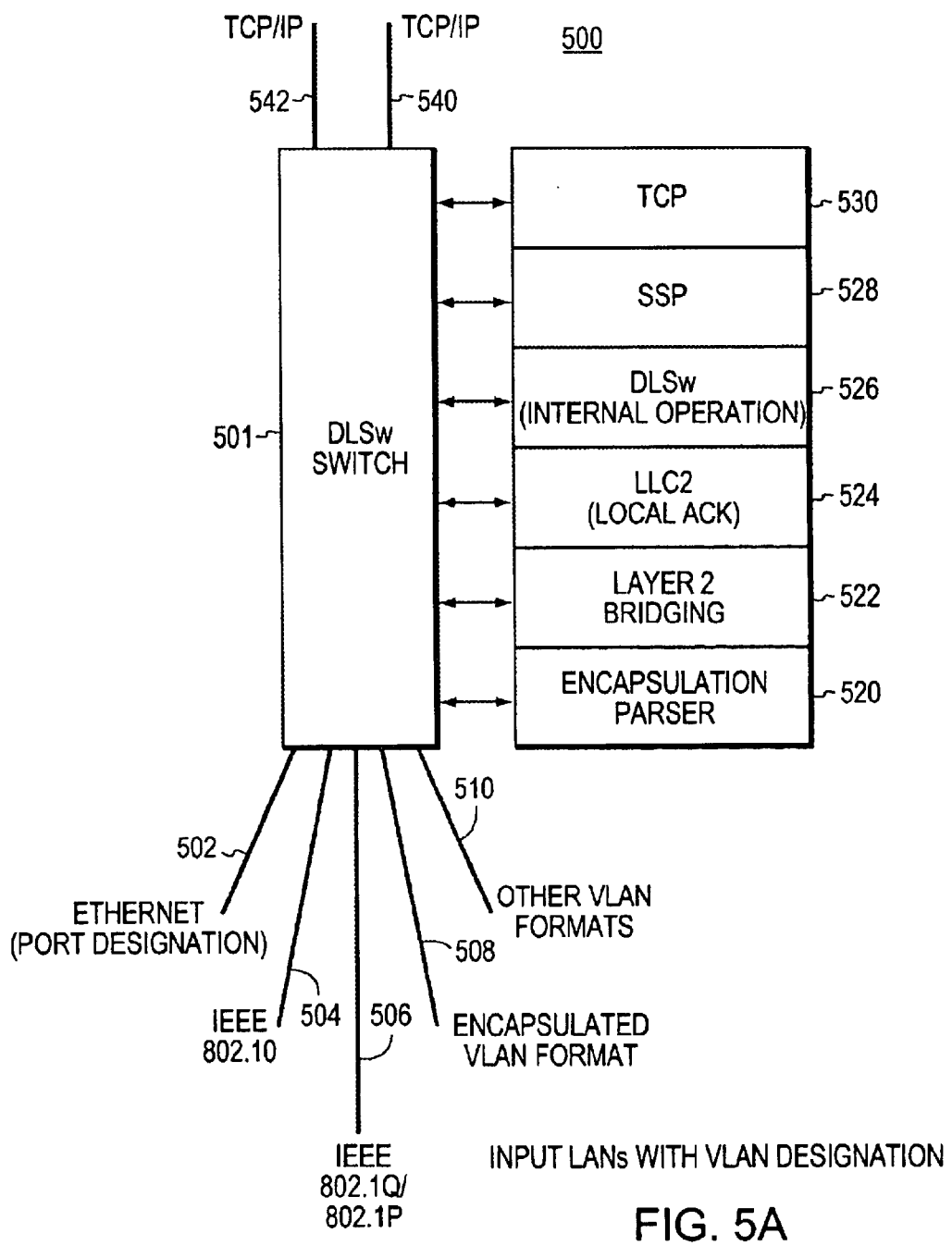
FIG. 5A is a block diagram of an architecture of a switch.

Turning now to FIG. 5A, DLSw 500 is shown. DLSw hardware 501 has inputs from LANs which support VLANs using a variety of technologies. Input 502 connects to an Ethernet VLAN. Input 504 connects to an IEEE 802.10 VLAN. Input 506 connects to an IEEE 802.1Q/IP VLAN.

Input 508 connects to an encapsulated packet type of VLAN, for example the proprietary Inter Switch Link (ISL) of Cisco Systems, Inc. Input 510 represents connection to any other type of VLAN supported on typical LAN hardware or protocol.

DLSw 500 uses software to execute process in performing routing of packets. Process executing in DLSw 500 comprise: Encapsulation Parser process 520; Layer 2 Bridging process 522; LLC2 (Local ACK) process 524; DLSw Internal Operation process 526; SSP process 528; and TCP process 530. Encapsulation Parser process 520 examines an incoming packet and decides if the packet is a VLAN packet, both by noting the port at which the packet was received and by parsing the header of the packet. In the event that the packet is a VLAN packet, then Encapsulation Parser 520 determines the VLAN Identification Number (VLAN ID) of the packet.

Figure 5B:
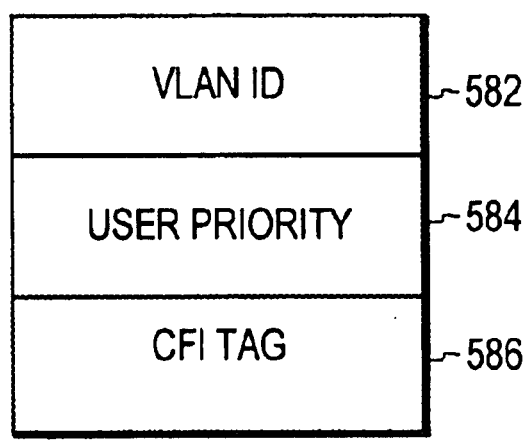
FIG. 5B is a block diagram of a data structure maintained by a switch.

Turning now to FIG. 5B, VLAN data structure 580 is more fully described. Once a VLAN identification Number is determined, then Encapsulation Parser 520 writes the VLAN ID into field 582 of VLAN Data Structure 580 shown in FIG. 5B. VLAN Data Structure 580 is held in memory in DLSw hardware 501, as is more fully described below with reference to FIG. 13. The VLAN ID is often a 12 bit number as described hereinbelow with reference to a variety of VLAN protocols. Various VLAN protocols also carry a User Priority field in the frame of a VLAN packet, and Encapsulation Parser 520 reads the User Priority from the packet and writes it into User Priority field 584 of VLAN data structure 580. Further, VLAN packet protocols often carry a CFI Tag in a one (1) bit field to indicate whether the packet data is written in canonical form or non-canonical form. Encapsulation Parser 520 reads the CFI Tag from the header of the incoming packet and writes it into CFI Tag field 586 of VLAN Data Structure 580. In the above example, the total number of bits stored in VLAN data structure 580 is 16 bits: 12 bits are the VLAN ID written into field 582; 3 bits are the user priority written into field 584; and 1 bit is the CFI tag written into field 586. Accordingly, the VLAN data structure 580 comprises two (2) bytes. These two (2) bytes are written into field 310 of the SSP header when the VLAN packet is encapsulated for TCP/IP transmission by the DLSw switch.

As a received packet is passed up the protocol layers from encapsulation parser 520 to Layer 2 bridging function 522, then to LLC2 (Local ACK) function 524, then to DLSw (internal operation) function 526, then to SSP function 528, and finally to TCP function 530, data structure 580 remains with the packet.

In routing a received packet from a VLAN, DLSw switch 500 uses functions 520, 522, 524, 526, 528, 530. After receipt of a packet, encapsulation parser 520 reads the VLAN identification contained in the received packet, for example, from a VID field (for example field 810 shown in FIG. 8 hereinbelow) of the received packet, and then passes the packet to the layer 2 bridging function 522. Alternatively, in an alternative embodiment of the invention, the port of the router is simply assigned a VLAN identification, as described by Ross in U.S. Pat. No. 5,394,402, and in this event the port identification is written into field 582 of data structure 580. Encapsulation parser 520 also determines the user priority by reading the appropriate field of the incoming packet, and writes the value to field 584 of data structure 580. Encapsulation parser 520 also reads the CFI Tag field from the incoming packet and writes the value into CFI field 586 of VLAN data structure 580.

Layer 2 bridging function 522 performs layer 2 bridging, if required, and passes the packet to LLC2 (Local ACK) function 524.

LLC2 (Local ACK) function 524 then generates an acknowledgment message for LLC2 connection protocols, if required. LLC2 function 524 then passes the packet to DLSw internal operations function 526.

DLSw internal operations function 526 then performs functions needed for DLSw operations. DLSw function 528 then passes the packet to SSP function 528.

SSP function 528 then builds an encapsulated packet in accordance with the SSP standards of RFC 1795 by first reading the fields of VLAN data structure 580 which is attached to the packet as the packet progresses through the layers 520, 522, 524, 526 of the functions of DLSw switch 500. The SSP header is shown in FIG. 3 and FIG. 4, with the data from VLAN data structure 580 placed in the two bytes of field 310, byte 12 and byte 13, of the SSP header. SSP function 528 then passes the packet to function TCP 530.

Figure 11:
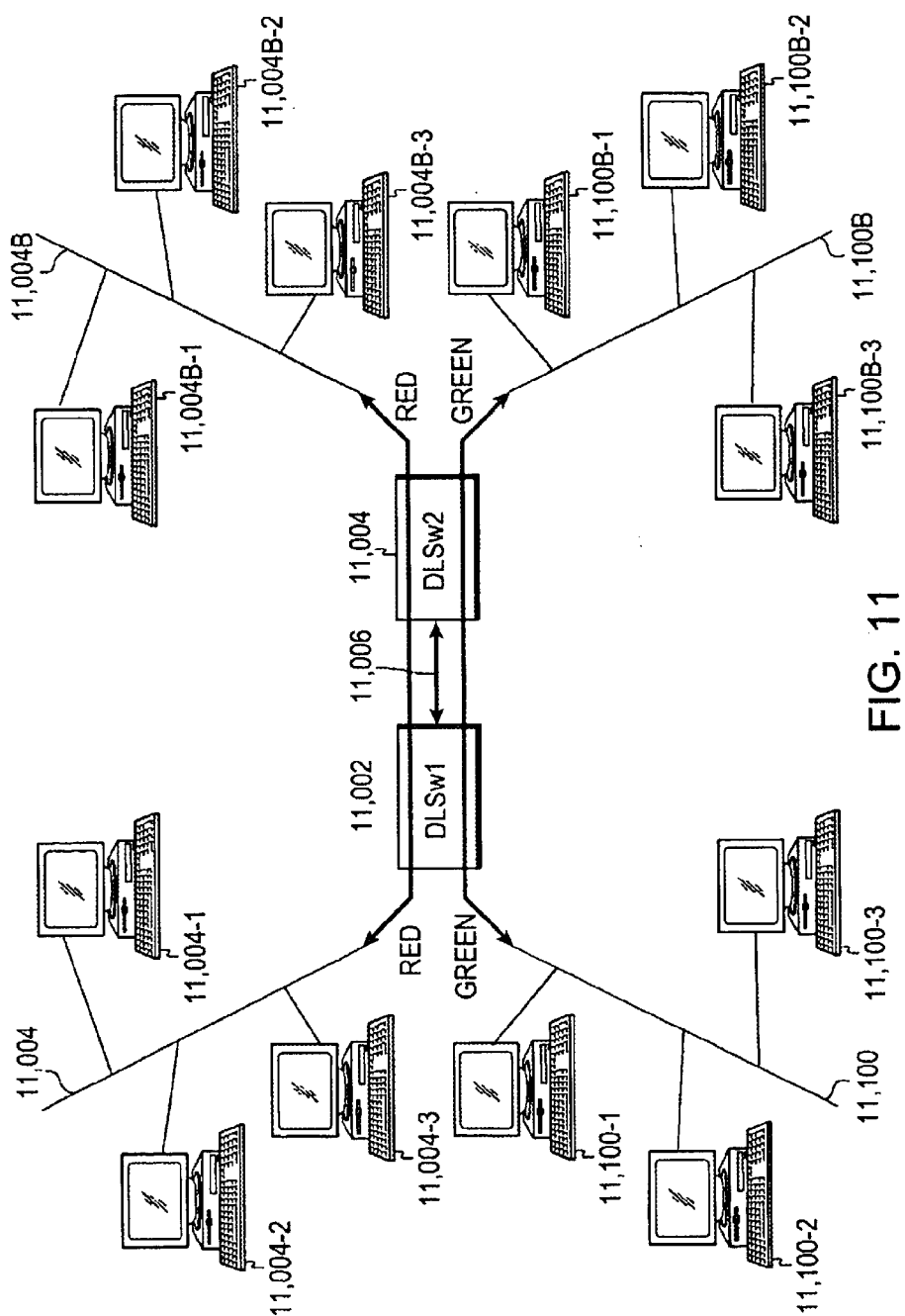
FIG. 11 is a block diagram of a VLAN.

TCP function 530 then transmits the encapsulated packet as shown with reference to FIG. 2 through a TCP/IP connection using outgoing port 540 to transmit onto connection 11,006 shown in FIG. 11.

Turning now to FIG. 6, network 600 having a plurality of Ethernet VLANs 602, 604, 606, 608 is shown. It is a common practice to identify Ethernet VLANs with a color, and this practice is followed in FIG. 6, with: VLAN 602 being identified with Green; VLAN 604 being identified with Red; VLAN 606 being identified with Blue; and finally VLAN 608 being identified with any other color, indicated as "Etc." Router 620 supports the Ethernet VLANs by having ports assigned to specific VLANs, for example, as disclosed by F. E. Ross in U.S. Pat. No. 5,394,402 issued Feb. 28, 1995, all disclosures of which are incorporated herein by reference.

Ethernet VLANs may be implemented by router 620 having its ports assigned to specific VLANs. For example, VLAN 602 (the Green VLAN) is connected to port 622. Port 622, internally to router 620, is assigned to the "Green" VLAN. Other ports, for example a plurality of ports as represented by port 623, may also be assigned to the Green VLAN. Additionally, port 621 is assigned to the Green VLAN. Operation of router 620 is as follows: when a packet arrives from the Green VLAN ports 621, 622, 623 or any other port assigned to the Green VLAN, then router 620 realizes that the packet has arrived on a Green port. Router 620 then forwards the packet out onto only ports which are also associated with the Green VLAN, and onto no other ports. In FIG. 6, port 621 is assigned to the Green VLAN. Accordingly, when a packet arrives on any Green port (622, 623) the packet is forwarded out on port 621. From port 621 the packet travels over a connection (electrical, optical, etc.) to port 624 of DLSw 630, and port 624 of DLSw is identified by DLSw 630 as a Green VLAN port.

Without the VLAN implementation in router 620, a packet received on a port, for example port 622, would be forwarded to all ports of router 620. However, with the VLAN implementation in router 620, when a packet arrives on a port assigned to a particular VLAN, usually designated as a color, the packet is forwarded out on only the other ports which are assigned to that VLAN. Accordingly, when a packet arrives from VLAN 604, the "Red" VLAN, at port 632, then router 620 forwards it out on only the ports associated with the Red VLAN, including port 634. From port 634 the packet travels over a connection to port 636 of DLSw 630.

Similarly, a packet arriving on VLAN 606, the "Blue" VLAN at port 640 is forwarded out on only those ports associated with the Blue VLAN, including port 642. From port 642 the packet travels to Blue port 644 of DLSw 630. Additional Ethernet VLANs can be defined by different colors, etc., and any such additional VLANs are indicated by VLAN 608 which connects to "Etc. Port" 646. From port 646, the packet is forwarded only to the ports associated with that VLAN, including port 648 from which it travels to a like identified port 650 of DLSw 630.

Upon receipt of Ethernet packets on one of its ports designated for Ethernet VLANs, DLSw 630 creates a TCP/IP connection over TCP/IP connections 652, 654. The connection is established by DLSw 630 placing the VLAN indicia, expressed as a binary number representing the color, into field 402 of control message 400. The TCP/IP connection is then established by DLSw 630 establishing the connection with a similar DLSw (as shown in FIG. 1) at the other end of TCP/IP connections 654 652. One of the TCP/IP connections is used by DLSw 630 for forwarding outgoing packets to a destination DLSw, for example TCP/IP connection 652. The other TCP/IP connection, for example TCP/IP connection 654, is used by DLSw 630 for receiving packets, including packets having VLAN indicia in field 402 of the control message and field 310 of data frame headers 202 (FIG. 2 and FIG. 3).

In commercial apparatus both router 620 and DLSw switch 630 are often enclosed in the same cabinet, as shown by frame 660. The logical arrangement of the router block 620 and the DLSw block 630 within the cabinet of frame 660 illustrates, for example, a method of preserving the VLAN identification as the packet moves from the router function to the DLSw function of the apparatus.

Figure 7:
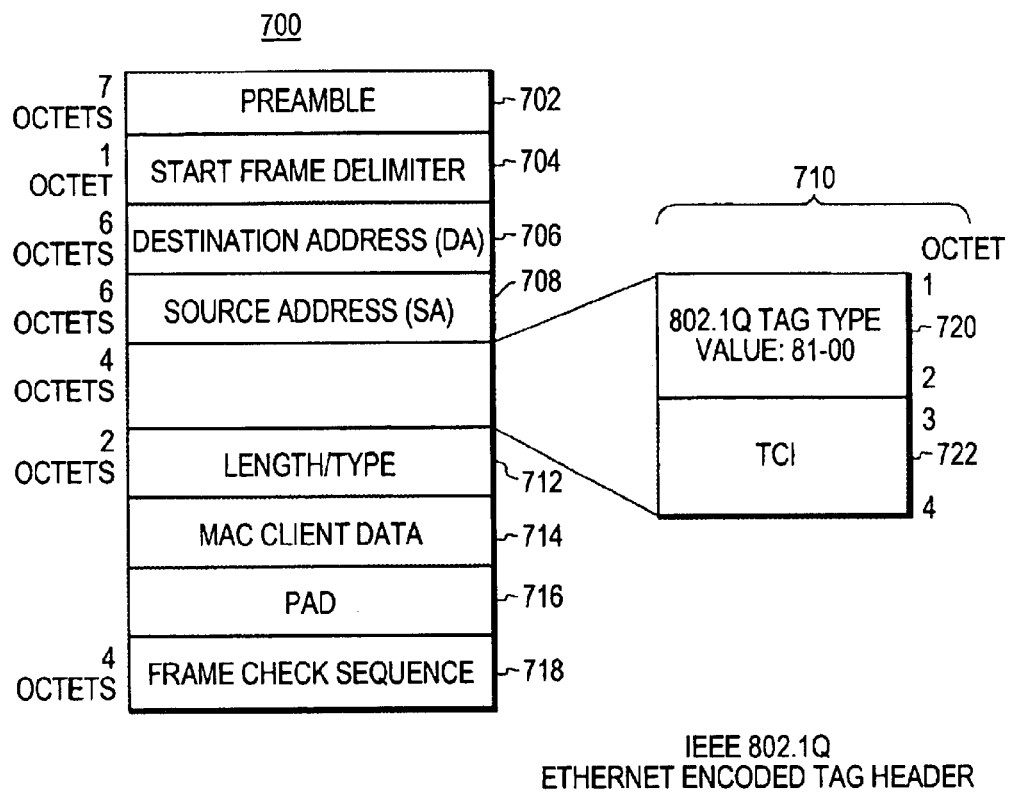
FIG. 7 is a block diagram of fields of an IEEE 802.1Q Ethernet packet.

Turning now to FIG. 7, a format 700 for an IEEE 802.1Q VLAN frame is shown for encoding VLAN identification (VID) in an IEEE 802.3 Ethernet packet. The ordinary IEEE 802.3 fields comprise: preamble field 702 of seven (7) octets; start frame delimiter field 704 of one (1) octet; destination address (DA) field 706 of six (6) bytes; source address field (SA) 708 of six (6) bytes; VLAN information fields 710; length/type field 712 of 2 octets; MAC client data field 714, which is the LLC header and data fields; pad field 716 which is included to pad out the frame length to 68 bytes, if needed in accordance with the IEEE 802.3 Ethernet specification; and, the frame check sequence (FCS) field 718. The IEEE 802.1Q VLAN information fields 710 are inserted immediately following source address field 708, and before the length type field 712. Accordingly, the VLAN information fields 710 are in the Layer 2, or MAC, part of the packet. The IEEE 802.1Q fields are shown separated from the ordinary Ethernet packet fields to emphasize that VLAN tagging is encoded in the Ethernet packet.

The IEEE 802.1Q VLAN information is encoded in four (4) bytes designated as bytes 710. Bytes 1 and 2 are referred to as the 802.1Q tag type field 720, and the bytes contain the value "81-00" (as expressed in decimal). When the receiving computer detects this value in the first two bytes following the source address 708, the computer knows that it has an IEEE 802.1Q packet tagged for VLAN identification. Bytes 3 and 4 contain the Tag Control Information (TCI) field 722. TCI field 722 is shown in FIG. 8, and has three (3) fields.

Figure 8:
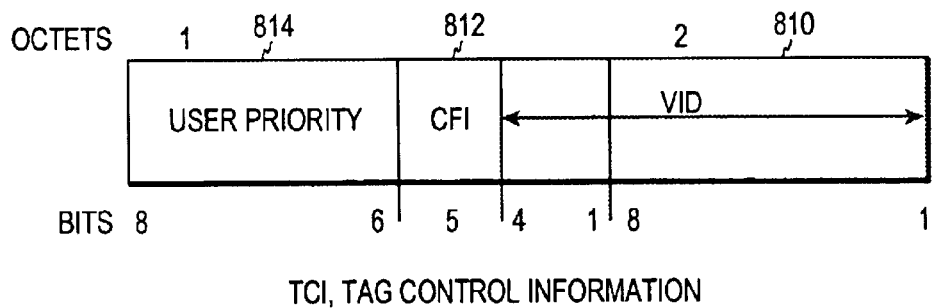
FIG. 8 is a block diagram of a Tag Control Information field.

As shown in FIG. 8, the VLAN identification field 810 (abbreviated VID field) is twelve (12) bits in length and occupies 4 bits of one byte and all 8 bits of the other byte. CFI tag field 812 is 1 bit and indicates whether certain data is written in the packet in canonical format (IEEE 802.3 Ethernet format) or in non-canonical format (IEEE 802.5 Token Ring format), as set out in the IEEE 802.1Q specification. Field 814 is the user priority field of 3 bits, particularly as set out in various IEEE standards, including for example IEEE 802.5 Token Ring and IEEE 802.1Q VLAN tagging.

Figure 9:
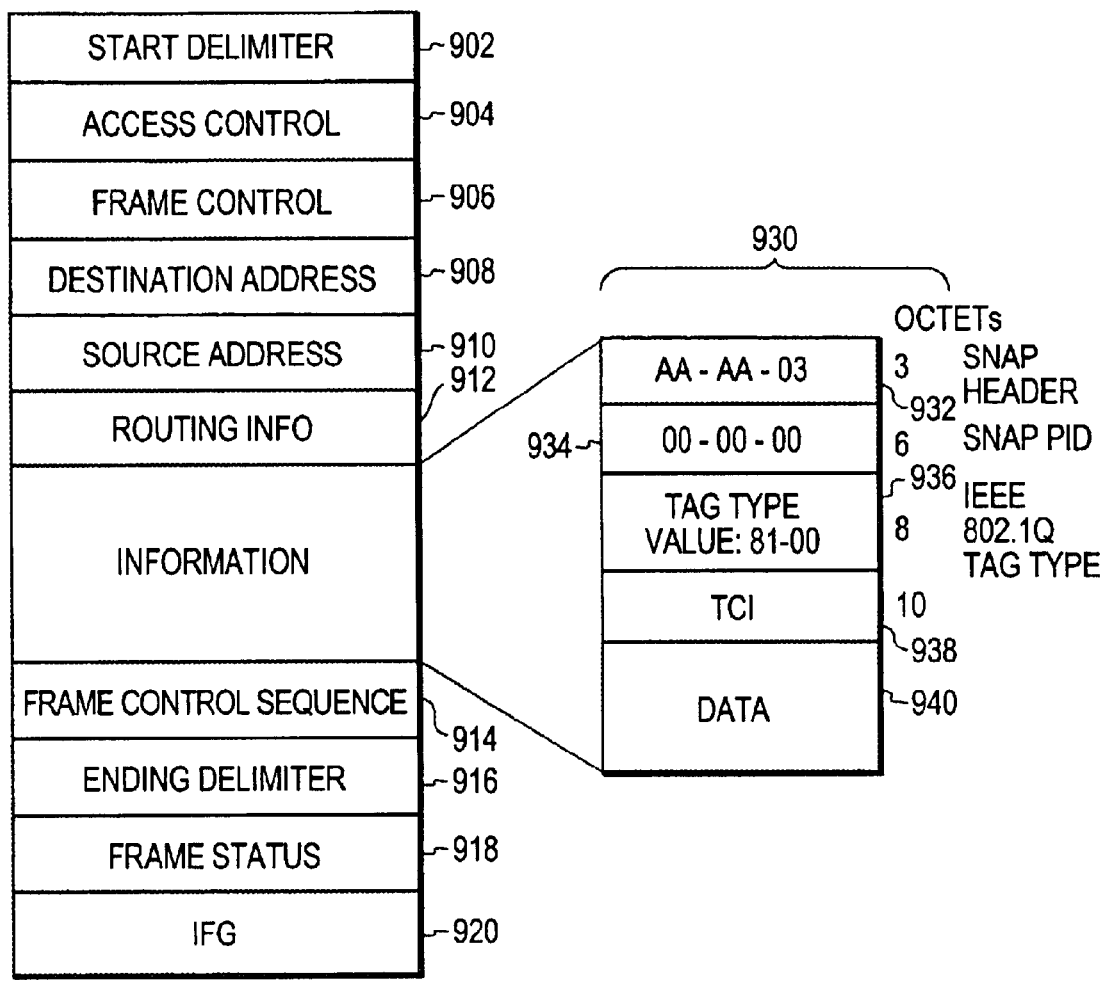
FIG. 9 is a block diagram of fields of an IEEE 802.1Q Token Ring packet.

Turning now to FIG. 9, a format 900 for an IEEE 802.1Q VLAN frame is shown for encoding VLAN identification (VID) in an IEEE 802.5 Token Ring packet. The ordinary IEEE 802.5 Token Ring fields comprise: start delimiter field 902; access control field 904; frame control field 906; destination address field 908; source address field 910; routing information (RIF) field 912, frame control sequence field 914; ending delimiter field 916; frame status field 918; and, inter frame gap (IFG) 920. IEEE 802.1Q VLAN tag fields are in the SNAP SAP encoded option. SNAP header field 932 is three (3) bytes and contains the hexadecimal values "AA AA 03". SNAP protocol identifier (PID) field 934 is three (3) bytes and contains the hexadecimal values "00 00 00". IEEE 802.1Q tag type field 936 is two (2) bytes and contains the value "81 00". TCI field 938 is two (2) bytes and contains the "Tag Control Information" as shown in FIG. 8, and as discussed hereinabove. Data field 940 contains the usual Layer 3 header and the other data fields.

Figure 10:
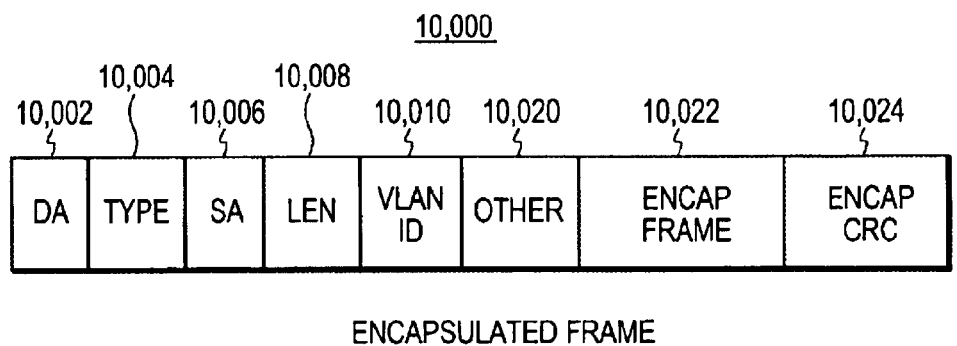
FIG. 10 is a block diagram fields of an encapsulated VLAN packet.

Turning now to FIG. 10A, encapsulated frame 10,000 is shown. Field DA 10,002 is the Destination Address. Field 10,004 is the Type Field. The Type indicates the type of virtual LAN, and, for example, may indicate an Ethernet LAN, an IEEE 802.5 token ring LAN, an FDDI token ring LAN, an ATM LAN network, etc. Field 10,006 SA is the Source Address Field. Field 10,008, LAN is the Length Field. Length Field 10,008 gives the length in bytes of the encapsulated frame. Field 10,010, VLAN ID, is the virtual local area network identification. Other Field 10,020 represents other fields which a manufacturer may utilize in an encapsulated frame-type protocol, and may range from zero to a plurality of "other" fields, as required by the manufacturer's protocol. Field 10,022, the Encapsulated Frame field holds the frame or packet which is encapsulated in packet 10,000. Field 10,024 contains cyclic redundancy check data, and, for example, the CRC covers the entire encapsulated frame 10,000.

Turning now to FIG. 11, VLANs utilizing a "color" designation is shown as network 11,000. Data link switch, DLSw1 11,002 is a data link switch connected to "red" VLAN 11,004. Connection 11,006 is a TCP/IP bidirectional network communication connection. DLSw2 11,004 provides the other end of the TCP/IP 11,006 connection. Also DLSw1 and DLSw2 provide a routing function to the local area networks connected to their ports. For example, red VLAN 11,004B is shown. In operation, a packet transmitted by a "red" VLAN computer 11,004-1, 11,004-2, 11,004-3, etc. is transmitted through TCP IP connection 11,006, and is routed exclusively by DLSw2, 11,004 to the red VLAN 11,004B.

Similarly, green VLAN 11,100 has attached thereto green VLAN computers 11,100-1, 11,100-2, 11,100-3, etc. Green VLAN 11,100 connects to DLSw1 as the "green" VLAN. Packets transmitted onto "green" VLAN 11,100 via computers connected thereto, for example, computer 11,00-1, 11,100-2, 11,100-3, etc. is transmitted over TCP/IP connection 11,006 to DLSw2, 11,004. DLSw2 11,004 routes the incoming packet from TCP/IP connection 11,006 onto green VLAN 11,100B, and onto no other local area network. Any computer connected to green VLAN 11,100B, for example, 11,100B-1, 11,100B-2, 11,100B-3, etc. can receive the packet. Other computers to which DLSw2 routes packets will not receive the packets. For example, a packet routed to the green VLAN will be received by computers connected to green VLAN 11,100B, but will not be received by computers connected to red VLAN 11,004B.

In common designs of virtual local area networks, both red VLAN 11,004, 11,004B, and green VLAN 11,100, 11,100B, may be implemented on a single electrical local area network. For example, red VLAN 11,004 and green VLAN 11,100 may both be implemented with all of their computers connected to a single Ethernet bus. As shown with respect to FIG. 7, the red and green VLANs are kept separate by use of VLAN tag TCI 722, the tag control information. As shown in FIG. 8, the virtual LAN identifier 810 contains a twelve (12) bit VLAN identifier 810 in the packet header. DLSw1 11,002 then inserts the Ethernet VLAN ID read from Field 810 into VLAN Identifier Field 310 as indicated in FIG. 3, before transferring the packet across TCP/IP connection 11,006. DLSw2 11,004 then reads header field 310, learns the VLAN identifier, and re-transmits the packet onto the appropriate Ethernet port which may include, electrically, both the red VLAN 11,004B and the green VLAN 11,100B. Computers connected to the red VLAN 11,004B then read the virtual identifier field 810 from the packets that are detected by their MAC layer, and receives the packets on the VLAN to which the computer is assigned, and ignore packets for any VLAN for which the computer is not assigned. Accordingly, by reading Field 810 of the received packets. Red VLAN 11,004B receives only red" VLAN packets and green VLAN 11,100B receives only green VLAN packets.

In routing received packets from red VLAN 11,004 and green VLAN 11,100, DLSw1 11,002 utilizes the routing functions of DLSw switch 500 shown in FIG. 5. After receipt of a packet, encapsulation parser 520 reads the VLAN identification contained in the received packet, for example, from VID field 810 of the received packet, and then passes the packet to the layer 2 bridging function 522.

Layer 2 bridging function 522 performs layer 2 bridging, if required, and passes the packet to LLC2 (Local ACK) function 524.

LLC2 (Local ACK) function 524 then generates an acknowledgment message for LLC2 connection protocols, if required. LLC2 function 524 then passes the packet to DLSw internal operations function 526.

DLSw internal operations function 526 then performs functions needed for DLSw operations. DLSw function 528 then passes the packet to SSP function 528.

SSP function 528 then builds an encapsulated packet in accordance with the SSP standards of RFC 1795, as shown in FIG. 3 and FIG. 4, with the addition of placing the VLAN identifier in field 310, byte 12 and byte 13 of the SSP header. SSP function 528 then passes the packet to function TCP 530.

TCP function 530 then transmits the encapsulated packet as shown with reference to FIG. 2 through a TCP/IP connection using outgoing port 540 to transmit onto connection 11,006 shown in FIG. 11.

Correspondingly, DLSw2 11, 004 receives an incoming SSP packet over TCP/IP connection 11,006 through input port 542 of DLSw2 11,004. Encapsulation parser 520 reads Field 310 of the SSP packet and writes the VLAN indicator obtained therefrom into, for example, virtual LAN identifier field 810 of a packet which it then transmits onto appropriate outgoing port of DLSw2. The computers electrically connected to that port then obey the commands of the protocol, for example IEEE 802.1Q protocol, and receive only the packets for which their VLAN identifier is receptive.

Figure 12:
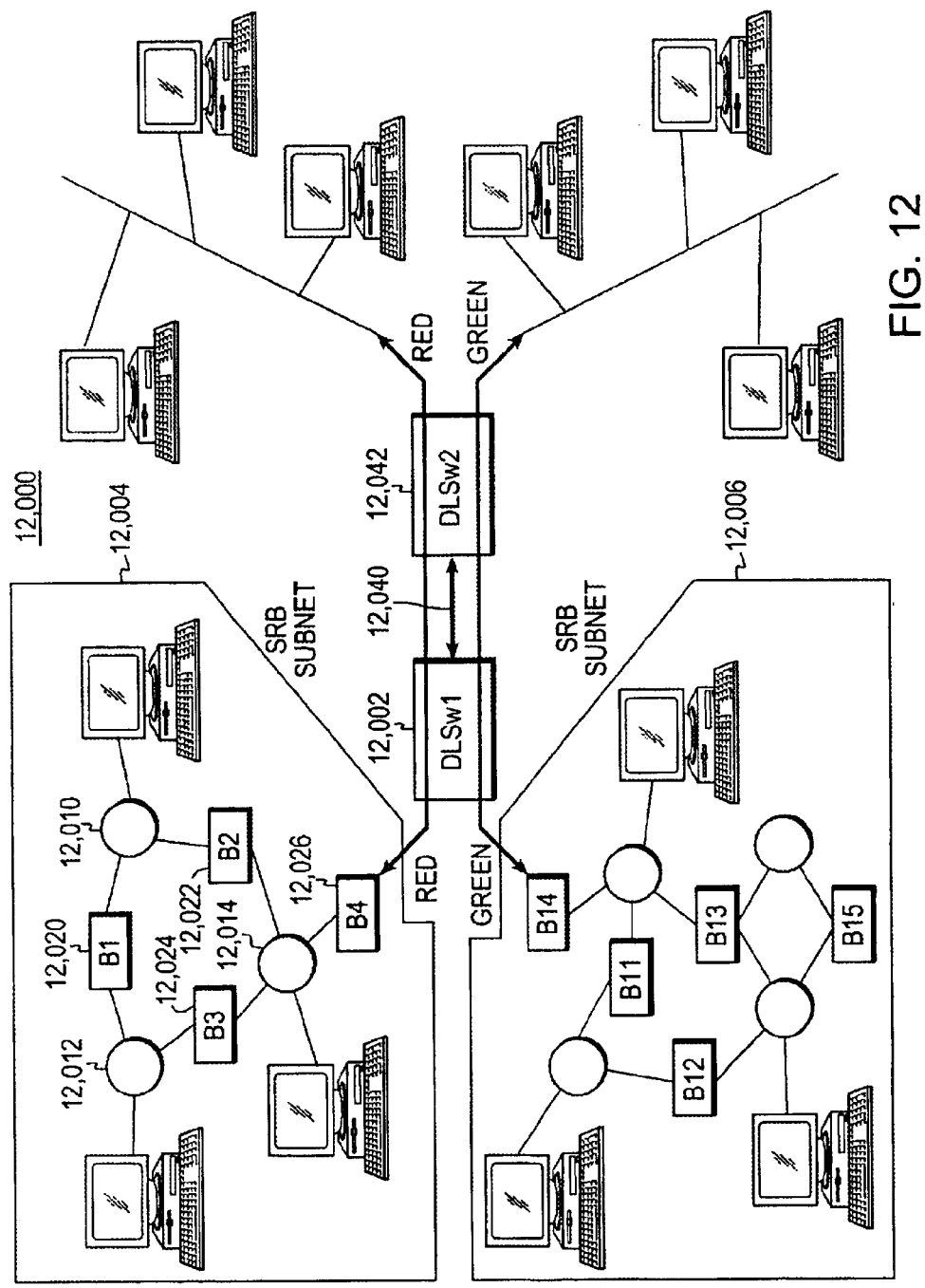
FIG. 12 is a block diagram of a VLAN showing assignment of colors to identify a VLAN.

Turning now to FIG. 12, network 12,000 is shown. Network 12,000 is similar to network 11,000, with the difference that SRB subnets are explicitly shown connected to DLSw1 12,002. SRB subnet 12,004 is designated as the red VLAN. SRB subnet 12,006 is designated as the green VLAN subnet. Red SRB subnet 12,004 comprises, for example, IEEE 802.5 token rings 12,010, 12,012, and 12,014. These token ring LANs are connected by bridges, for example, bridge B1 12,020, bridge B2 12,022, and bridge B3 12,024. Bridge B4 12,026 connects token ring 12,014 to DLSw1 12,002.

Similarly, bridge B14 12,030 connects the IEEE 802.5 token rings of SRB subnet 12,006 to DLSw1 12,002. Packets transmitted on SRB subnet 12,006 have, for example, fields as shown in FIG. 9. Field 938, the TCI field contains the VLAN identifier. The red SRB subnet 12,004 is identified by a first number in TCI field 938, whereas in contrast, green VLAN 12,004 is identified by a different number in TCI field 938. As an example, both red VLAN 12,004 and green VLAN 12,006 may be different physical devices and end station computers. As a further example, both red VLAN 12,004 and green VLAN 12,006 may comprise the same IEEE 802.5 token ring hardware, the same SRB bridges, and the VLANs distinguished by the different VLAN ID numbers carried in the IEEE 802.1Q headers at TCI field 938, as shown with reference to FIG. 9.

Again, DLSw1 12,002 encapsulation parser 520 reads TCI field 938 to determine the VLAN identifier of a received packet and writes that VLAN identifier into field 310 of the SSP header of an encapsulated frame that is transmitted under TCP/IP protocol onto connection 12,040 to DLSw2 12,042.

DLSw2 12,042 then writes data read from field 310 of the incoming packet into the appropriate field of an outgoing packet. DLSw2 12,042 then transmits the outgoing packet onto the appropriate port to reach the destination VLAN. In this example, in the event that the packet is designated to the red VLAN, the outgoing packet will be transmitted onto VLAN 12,050. The outgoing packet transmitted onto red VLAN 12,042 will have the headers shown in FIG. 9, for an IEEE 802.1Q frame. In the example that red VLAN 12,050 and green VLAN 12,052 are electrically the same local area network, then the computers on the respective red and green VLANs utilize TCI Field 938 in order to determine whether or not they should receive the packet as it is detected by their MAC layer structure.

HARDWARE

Figure 13:
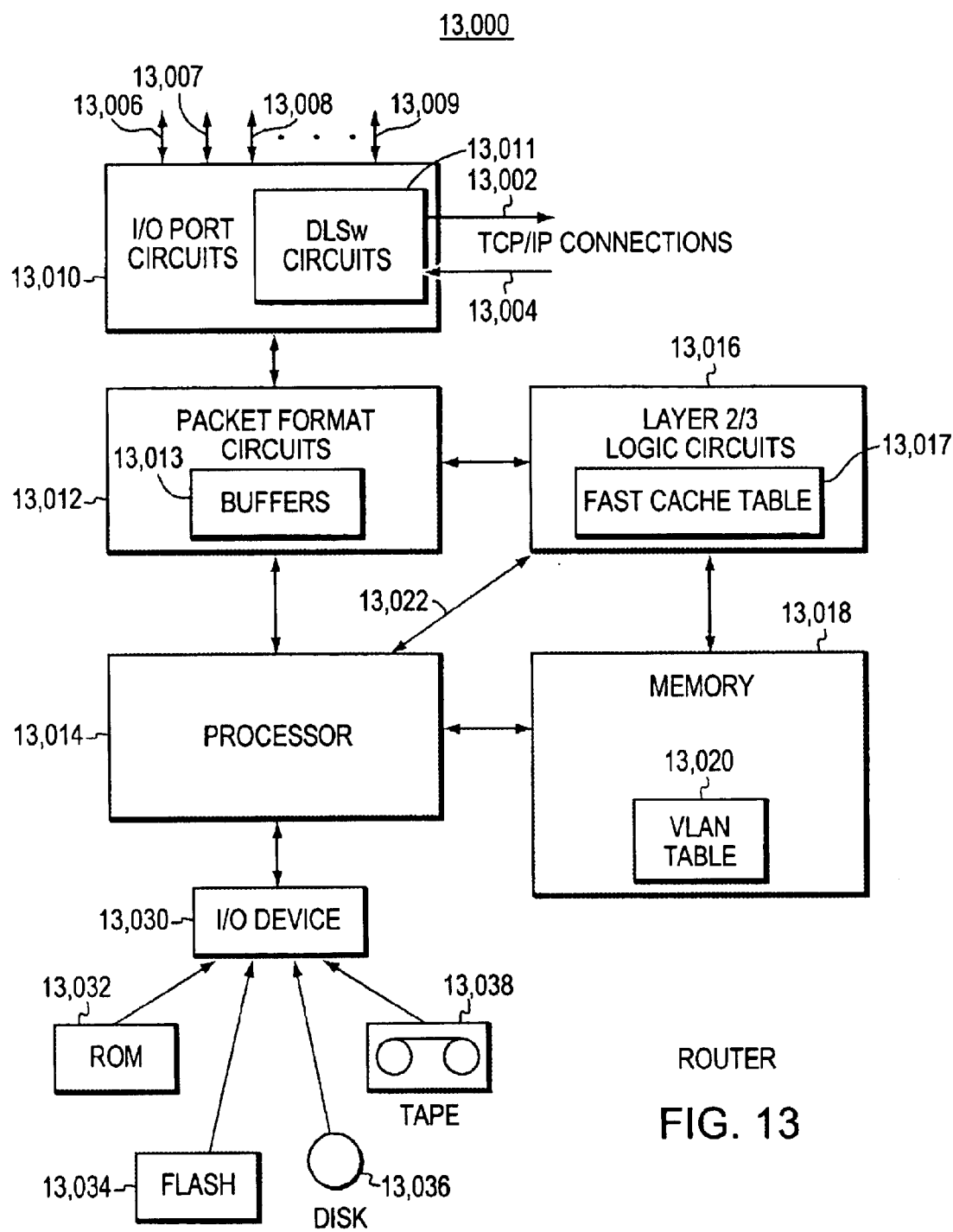
FIG. 13 is a functional block diagram of a network switch, including both a router and a DLSw switch.

Turning now to FIG. 13, a hardware functional block diagram of an exemplary network switch 13,000 is shown. Network switch 13,000 contains a DLSw portion with DLSw ports 13,002, and 13,004. Each DLSw port connects to a TCP/IP network. Network switch 13,000 also contains a router portion with router ports 13,006, 13,007, 13,008, 13,009, etc. Each router port 13,006, 13,007, 13,008, 13,009, etc. connects to a different LAN, a circuit to a wide area network (WAN), etc.

I/O port circuits 13,010 receive packets from the ports, and transmit packets onto the ports. DLSw circuits 13,011 perform the hardware functions needed to establish TCP/IP connections for TCP/IP ports 13,002 and 13,004. Packet Format Circuits 13,012 interpret data in fields of packets which are received. Packet Format Circuit block 13,012 also contains the buffers 13,013 used to temporarily store packets as they are received and before the packet is transmitted onto an output port. Processor 13,014 performs all of the router functions requiring a processor, including deciding which port a received packet should be routed to, responding to ARP Explorer packets, executing spanning tree protocol, etc. Memory 13,018 serves as random access memory for processor 13,014. Layer 2 and Layer 3 Logic Circuits 13,016 (Layer 2/3 Logic Circuits in FIG. 13) perform routing to destination LANs and destination stations in order to avoid copying packet data to processor memory 13,018.

VLAN Data Table 13,020 is a data structure in memory 13,018 and holds VLAN Data Structure 580. For example, VLAN Data Table 13,020 has fields for storing VLAN ID 582, User Priority 584, and CFI Tag 586 for each packet as it is being processed by DLSw switch 500. For example, Encapsulation parser 520 writes to the fields of VLAN Data Table 13,020 as a packet is being received and parsed. SSP process 528 and TCP process 530 then read from the fields of VLAN Data Structure 13,020 as a TCP/IP packet is being assembled for transmission over TCP/IP port 13,002. Packet Format Circuits 13,012 then write the data read by the SSP and TCP processes 528 530 into the appropriate fields of the packet before it is transmitted by DLSw circuits 13,011.

Likewise, as a TCP/IP packet is being received through TCP/IP port 13,004 encapsulation parser 520 writes to VLAN Data Table 13,020 fields (VLAN ID 582, User Priority 584, CFI Tag 586) as the data is parsed from the incoming TCP/IP packet. Then, as the packet is transmitted onto the appropriate LAN port 13,006, 13,007, 13,008, 13,009, etc. by I/O Port Circuits 13,010, Packet Format Circuits 13,012 write the data read from fields of VLAN Data Table 13,020 into the outgoing packet.

Processor 13,014 executes all code needed to operate the processes of DLSw 500, for example, Encapsulation Parser process 520, Layer 2 Bridging process 522, LLC2 (Local ACK) process 524, DLSw (internal operation) process 526, SSP process 528, TCP process 530). Processor 13,014 maintains VLAN Data Table 13,020. Also, Processor 13,014 maintains the data needed to handle protocols in all of the Layer 2, the Layer 3, and the Layer 4 protocols for which router 13,000 is responsive.

Input-Output device (I/O device) 13,030 is a device for reading or writing to a computer readable media. I/O device 13,030 is used to read the necessary code into memory 13,018 for execution by processor 13,014. I/O device 13,030 may be, for example: a ROM memory port with computer code and/or data permanently burned into the ROM; a FLASH memory port for a FLASH memory device, where the FLASH memory device holds data written into it from a download through a network port, and then semi-permanently fixed electrically so that the data remains intact after power is removed from the FLASH memory; a floppy disk drive; an optical disk drive (CD ROM drive); a magnetic tape drive, etc. Block 13,032 represents a read only memory device, ROM, of the type which has data permanently burned in during manufacture. Block 13,034 represents a FLASH memory device of the type that can have data written into by the local processor 13,014, and then the device "flashed" electrically at the command of the local processor 13,014 so that the data is semi-permanently stored in FLASH memory 13,034. Data so written into FLASH memory 13,034 persists even in the situation that electrical power is removed from FLASH memory device 13,034. Circle (disk) 13,036 represents, for example, a floppy magnetic disk media, or an optical disk (CD ROM), a 1.4 megabyte disk, a 2 gigabyte disk, etc. Block 13,038 represents a magnetic tape. Tape 13,038 may be, for example, a cartridge tape, a reel to reel tape, etc. Further, I/O device 13,030 may represent a magnetic hard drive mounted within router 13,000. In a preferred embodiment of the invention, I/O device 13,030 is coupled with both ROM memory 13,032 and FLASH memory 13,034. Data and or code can be received by router 13,000 through a network port 13,002 . . . 13,008, received by processor 13,014, and written into FLASH memory 13,034 by processor 13,014, where the stored data and code is made semi-permanent under the control of processor 13,014.

The media which can be read by I/O device 13,030 may have files transferred to memory 13,018 for execution by processor 13,014. For example, all files needed for execution the processes of the invention may be inputted to router 13,000 through I/O device 13,030. The files read by processor 13,014 for practice of the invention from I/O device 13,030 may have been transferred to FLASH memory 13,034 through a router port 13,000, 13,004, 13,006, . . . 13,008, etc., from a network connection, where the files are transmitted onto a network by a server (not shown), etc. Even though router 13,000 is shown having direct connection from processor 13,014 to Packet Format Circuits. 13,012, Layer 2/3 Logic Circuits 13,016, Memory 13,018, and I/O device 13,030, etc., the connections between these various components of router 13,000 may be through a common bus (not shown) as is standard in many computer devices.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for establishing a virtual local area network, comprising:

receiving a first packet by a first router, where said first packet is assigned to a first virtual local area network;

identifying said selected virtual local area network by said first router, and in response to said identifying, determining an indicia of said first virtual local area network;

writing said indicia of said virtual local area network into an encapsulating header, of an encapsulated packet;

transmitting said encapsulated packet over a network using TCP/IP format;

receiving said encapsulated packet by a second router, and in response to said receiving, learning said indicia of a virtual local area network from said encapsulated packet;

forwarding a second packet by said second router, in response to said indicia of a virtual local area network, onto a destination virtual local area network specified by said indicia.

2. A method for establishing a virtual local area network, comprising:

receiving a first packet by a first router, where said first packet is assigned to a first virtual local area network;

identifying said first virtual local area network by said first router, and in response to said identifying, determining an indicia of said first virtual local area network;

writing said indicia of said first virtual local area network into a SSP header;

transmitting an encapsulated packet having said SSP header over a DSLw connection using a TCP/IP protocol;

receiving said encapsulated packet by a second router, and in response to said receiving, learning said indicia of said first virtual local area network from said encapsulated packet;

forwarding a second packet by said second router, in response to said indicia of first virtual local area network, onto a destination virtual local area network specified by said indicia.

3. A method for establishing a virtual local area network, comprising:

receiving an encapsulated packet by a destination router over a network using TCP/IP format, said encapsulated packet having an encapsulating header having, an indicia of a source virtual local area network written into an encapsulating header of said encapsulated packet, said encapsulated packet having been built in response to a first LAN packet received by a source router from a source virtual local area network, said indicia of a source virtual local area network determined in response to said LAN packet, said encapsulated packet having been transmitted onto said network using TCP/IP format by said source router, identifying said source virtual local area network by said destination router in response to said indicia of a source virtual local area network read from said encapsulating header, and in response to said identifying, determining an indicia of said source virtual local area network;

forwarding a second packet by said destination router, in response to said indicia of a virtual local area network, onto a destination virtual local area network specified by said indicia.

4. The method of claim 3 wherein said designated connection is a TCP/IP connection established between said source router and said destination router, and said source router and said destination router are both DLSw switches.

5. A DLSw switch to establish a virtual local area network, comprising:

means for receiving an encapsulated packet by a destination router over a network using TCP/IP format, said encapsulated packet having an encapsulating header having, an indicia of a source virtual local area network written into an encapsulating header of said encapsulated packet, said encapsulated packet having been built in response to a first LAN packet received by a source router from a source virtual local area network, said indicia of a source virtual local area network determined in response to said LAN packet, said encapsulated packet having been transmitted onto said network using TCP/IP format by said source router, means for identifying said source virtual local area network by said destination router in response to said indicia of a source virtual local area network read from said encapsulating header, and in response to said identifying, determining an indicia of said source virtual local area network;

means for forwarding a second packet by said destination router, in response to said indicia of a virtual local area network, onto a destination virtual local area network specified by said indicia.

6. A DLSw switch to establish a virtual local area network, comprising:

a receiver to receive an encapsulated packet by a destination router over a network, said encapsulated packet having an encapsulating header having, an indicia of a source virtual local area network written into an encapsulating header of said encapsulated packet, said encapsulated packet having been built in response to a first LAN packet received by a source router from a source virtual local area network, said indicia of a source virtual local area network determined in response to said LAN packet, said encapsulated packet having been transmitted onto said transparently routed connection by said source router, a parser to identify said source virtual local area network by said destination router in response to said indicia of a source virtual local area network read from said encapsulating header, and in response to said identifying, determining an indicia of said source virtual local area network;

a transmitter to forward a second packet by said destination router, in response to said indicia of a virtual local area network, onto a destination virtual local area network specified by said indicia.

7. A computer readable media having a computer program written thereon to perform a process for establishing a virtual local area network, comprising:

receiving an encapsulated packet by a destination router over a transparently routed connection, said encapsulated packet having an encapsulating header having, an indicia of a source virtual local area network written into an encapsulating header of said encapsulated packet, said encapsulated packet having been built in response to a first LAN packet received by a source router from a source virtual local area network, said indicia of a source virtual local area network determined in response to said LAN packet, said encapsulated packet having been transmitted onto said transparently routed connection by said source router, identifying said source virtual local area network by said destination router in response to said indicia of a source virtual local area network read from said encapsulating header, and in response to said identifying, determining an indicia of said source virtual local area network;

forwarding a second packet by said destination router, in response to said indicia of a virtual local area network, onto a destination virtual local area network specified by said indicia.

8. Electronic signals on a computer network to supply a computer program to perform a process for establishing a virtual local area network, comprising:

receiving an encapsulated packet by a destination router over a transparently routed connection, said encapsulated packet having an encapsulating header having, an indicia of a source virtual local area network written into an encapsulating header of said encapsulated packet, said encapsulated packet having been built in response to a first LAN packet received by a source router from a source virtual local area network, said indicia of a source virtual local area network determined in response to said LAN packet, said encapsulated packet having been transmitted onto said transparently routed connection by said source router, identifying said source virtual local area network by said destination router in response to said indicia of a source virtual local area network read from said encapsulating header, and in response to said identifying, determining an indicia of said source virtual local area network;

forwarding a second packet by said destination router, in response to said indicia of a virtual local area network, onto a destination virtual local area network specified by said indicia.

9. A method for operating a virtual local area network (VLAN), comprising:

receiving an encapsulated packet by a router;

identifying an indicia of a first VLAN in said encapsulated packet, said indicia indicating a VLAN over which said packet traveled before said packet was encapsulated; and forwarding, in response to said indicia, a second packet by said router onto a destination VLAN, said destination VLAN specified by said indicia.

10. The method of claim 9, further comprising:

receiving said encapsulated packet from a DLSw connection.

11. The method of claim 9, further comprising:

receiving said encapsulated packet using a TCP/IP protocol.

12. The method of claim 9, further comprising:

parsing a SSP header of said packet in order to read said indicia.

13. The method of claim 9, further comprising:

receiving said packet through a connection which is not a VLAN connection.

14. A router, comprising:

a first input/output port to receive an encapsulated packet;

circuits to identify an indicia of a first VLAN in said encapsulated packet, said indicia indicating a VLAN over which said packet traveled before said packet was encapsulated; and logic circuits to forward through a second input output port, in response to said indicia, a second packet by said router onto a destination VLAN, said destination VLAN specified by said indicia.

15. The apparatus of claim 14, further comprising:

said first input output port to receive said encapsulated packet from a DLSw connection.

16. The apparatus of claim 14, further comprising:

said first input output port to receive said encapsulated packet using a TCP/IP protocol.

17. The apparatus of claim 14, further comprising:

circuits to parse a SSP header of said packet in order to read said indicia.

18. The apparatus of claim 14, further comprising:

said first input output port to receive said encapsulated packet through a connection which is not a VLAN connection.

19. A computer readable media, comprising:

said computer readable media containing instructions for execution in a processor for the practice of the method of claim 1 or claim 2 or claim 3 or claim 9.

20. Electromagnetic signals propagating on a computer network, comprising:

said electromagnetic signals carrying instructions for execution on a processor for the practice of the method of claim 1 or claim 2 or claim 3 or claim 9.

* * * * *